ARTHUR A. BRANT
EVERETT A. GILBERT
INVENTORS

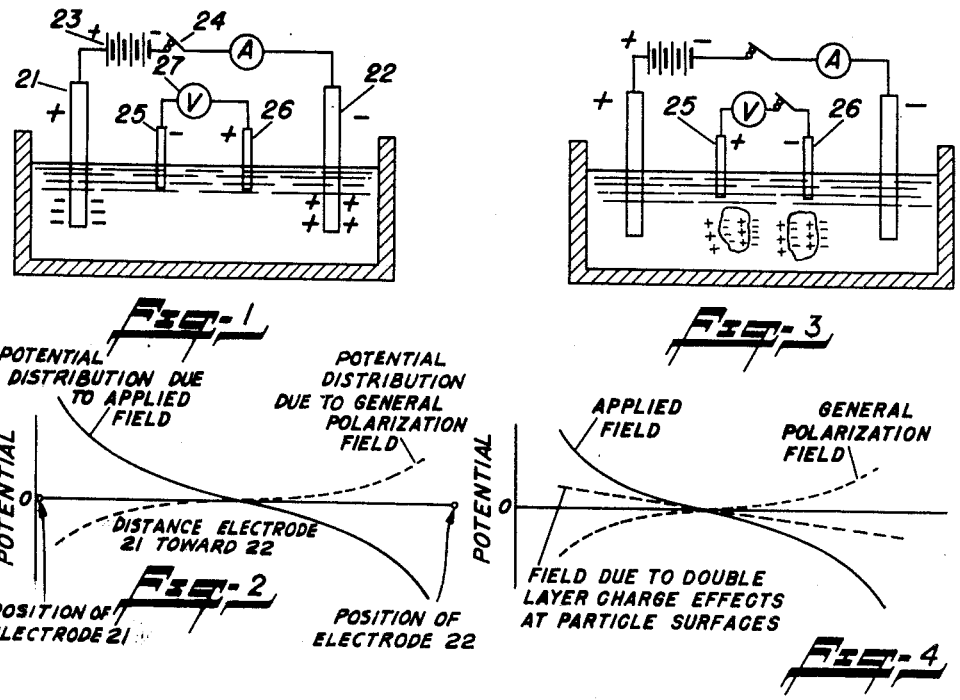
TABLE OF OVERVOLTAGE VALUES
| APPARENT DENSITY– AMPS. PER SQ. CM. → | 0.001 | 0.01 | 0.1 | 1.0 |
|---|---|---|---|---|
| METAL | OVERVOLTAGE IN VOLTS | | | |
| CADMIUM | 0.98 | 1.13 | 1.22 | 1.25 |
| MERCURY | 0.90 | 1.04 | 1.07 | 1.12 |
| TIN | 0.86 | 1.08 | 1.22 | 1.23 |
| BISMUTH | 0.76 | 1.05 | 1.14 | 1.23 |
| ZINC | 0.72 | 0.75 | 1.06 | 1.23 |
| LEAD | 0.52 | 1.09 | 1.18 | 1.26 |
| ALUMINUM | 0.56 | 0.83 | 1.00 | 1.29 |
| GRAPHITE | 0.60 | 0.78 | 0.98 | 1.22 |
| SILVER | 0.47 | 0.76 | 0.88 | 1.09 |
| COPPER | 0.48 | 0.53 | 0.80 | 1.25 |
| IRON | 0.40 | 0.56 | 0.83 | 1.29 |
| GOLD | 0.24 | 0.39 | 0.59 | 0.80 |
ARTHUR A. BRANT
EVERETT A. GILBERT
INVENTORS Sept. 16, 1952         A. A. BRANT ET AL         2,611,004
                    GEOPHYSICAL EXPLORATION
Filed Sept. 15, 1948                          6 Sheets-Sheet 2
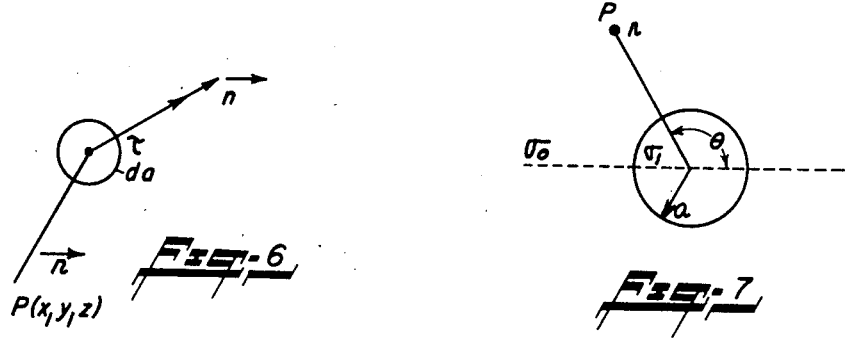
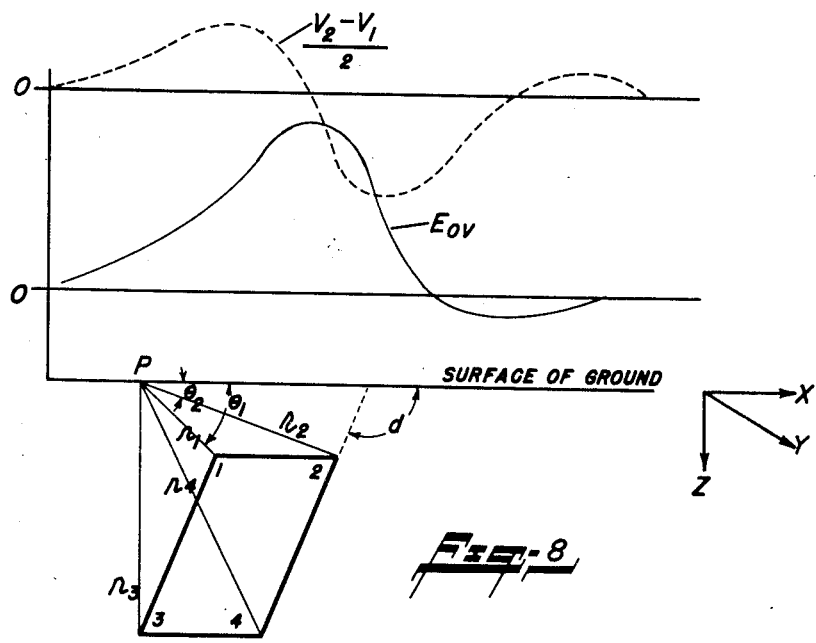
ARTHUR A. BRANT
EVERETT A. GILBERT
        INVENTORS
BY Rudolph J. Jusick
            ATTORNEY

BY Rudolph J. Lunick
ATTORNEY

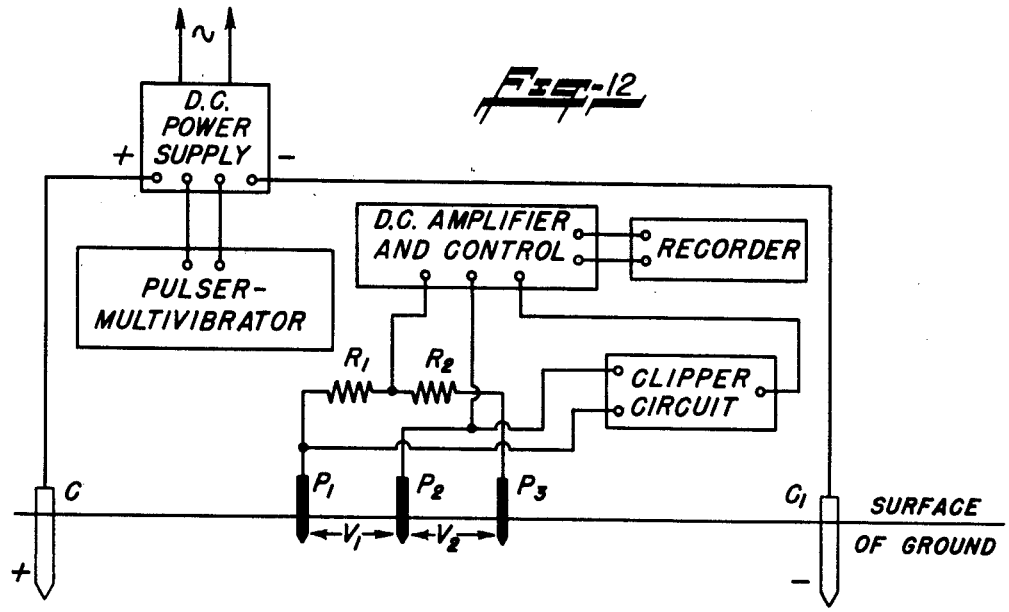
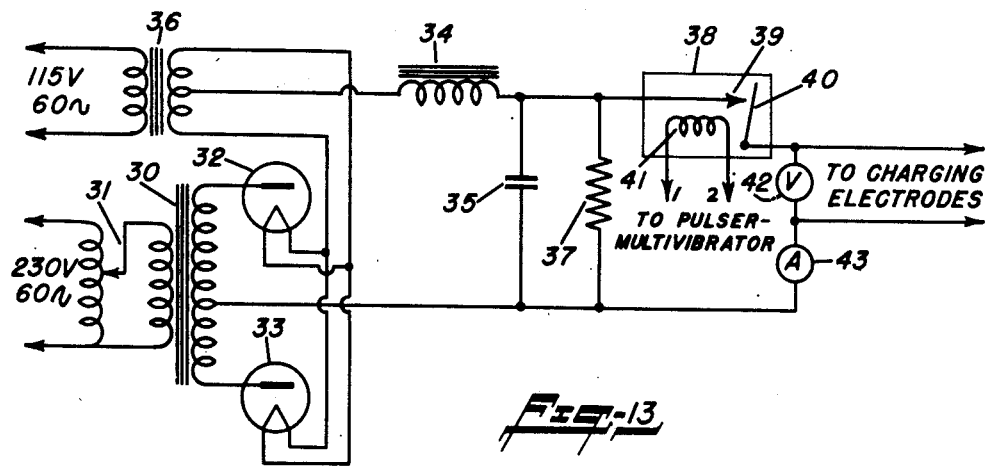

TO CORRESPONDING
TERMINALS ON AMPLIFIER
CIRCUIT - FIGURE 15

ARTHUR A. BRANT
EVERETT A. GILBERT
INVENTORS

BY Rudolph J. Jerick
ATTORNEY

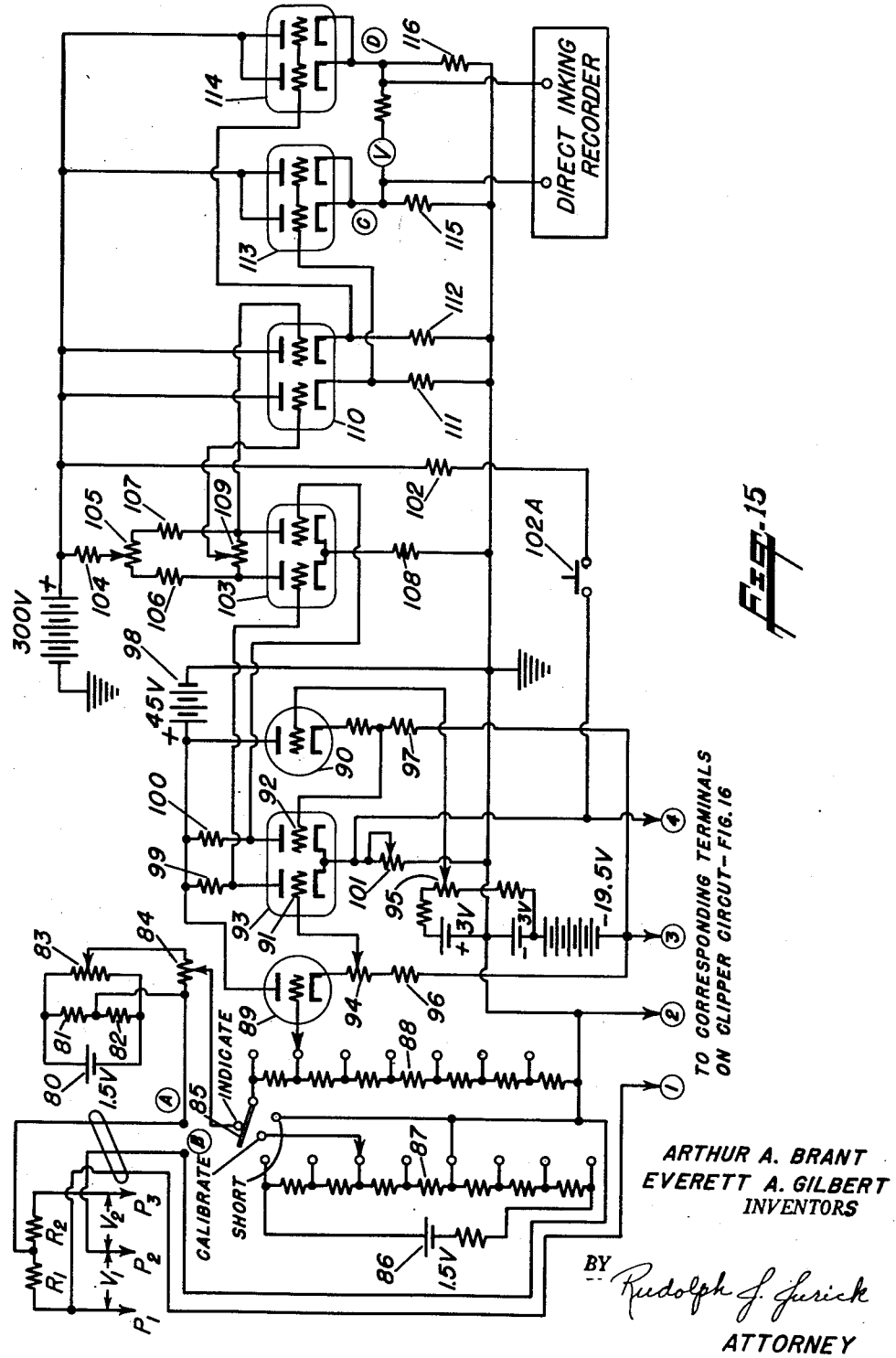

Patented Sept. 16, 1952

2,611,004

UNITED STATES PATENT OFFICE 2,611,004

GEOPHYSICAL EXPLORATION

Arthur A. Brant, Toronto, Ontario, Canada, and Everett A. Gilbert, Lake Hiawatha, N. J., assignors, by mesne assignments, to Geophysical Exploration Company, a corporation of Delaware Application September 15, 1948, Serial No. 49,354

13 Claims. (Cl. 175—182)

This invention relates to geophysical exploration and more particularly to a novel method and apparatus for the detection and location of scattered or concentrated metallic, mineral and carbon particles embedded in a medium permeated by an electrolyte.

Although the art of geophysical exploration includes numerous electrical methods for the determination of sub-surface conditions we shall refer briefly to two which, in a broad sense, will provide a background for the proper understanding of the present invention.

United States Patent No. 1,163,468 issued December 7, 1915, to C. Schlumberger, may be taken as representative of the early methods proposed for the detection and location of minerals below the ground surface. The method consists in maintaining a difference of potential between two charging electrodes on the surface of the ground and measuring the resultant potential difference appearing between two pick-up electrodes spaced apart but disposed within the limits of the charging electrodes. The potential difference appearing across the pick-up electrodes will vary with the magnitude of the current flowing through the earth between the charging electrodes and with the nature or character of the sub-surface conditions. Such potential variations provide the data from which certain deductions may be made with regard to the geological nature of the sub-soil. Inasmuch as the potential readings of the pick-up electrodes are taken during the period when the charging current is flowing through the ground this method fails to distinguish between the effects of many related and contributing factors with consequent reduction of diagnostic value.

Later workers in this field proposed various refinements based essentially upon the detection of the charging and discharging potentials effective as a result of electrical current flow through an electrolyte medium. These methods fall into a category referred to as electrolytic polarization methods and may be represented, for purposes of this discussion, by United States Patent No. 2,190,321 issued February 13, 1940, to G. Potapenko.

The Potapenko method comprises the insertion of two charging electrodes at spaced points in the ground. Two or more pick-up electrodes are also inserted into the ground but at points lying between the charging electrodes. A. D. C. charging current is fed into the ground through the charging electrodes and this current results in an ionic polarization of the sub-surface electrolyte medium lying within the range of the charging current flow. The flow of charging current is then interrupted after which any potential appearing across the pick-up electrodes is detected by suitable means, said potential being due to the discharging of the E. M. F. of polarization established in the electrolyte during the flow of the charging current. The character of the discharging E. M. F. of polarization is related to the nature of the electrolyte and data thus obtained is employed to determine geological sub-soil conditions.

Electrical methods of exploration may be considered as indirect in principle as they involve a critical interpretation of the data obtained in order to arrive at a conclusion with respect to the type, nature and character of the sub-surface conditions, strata, deposits, etc. The accuracy of interpretation of electrical prospecting results depends upon the ease with which interfering factors may be eliminated. While the electrolytic polarization method is adapted for oil exploration, due to the polarization effects arising from the porosity differences (per cent electrolyte) of the formations concerned, it is not satisfactory for the detection and identification of scattered mineral, metallic and carbon particles as contemplated by this invention. These substances are generally found in nature as sulphides and we have found that a practical method and apparatus for the detection of such substances must inherently involve means for ascertaining what may be termed effects of the second order of refinement. A more thorough understanding of our invention will be had from the following detailed description. For the present it will suffice to point out that our method and apparatus for geophysical exploration is based upon an electro-chemical effect identified as the Overvoltage Effect or electrical double layer charging effect occurring at the surfaces of metal particles in an electrolyte.

An object of this invention is the provision of a method and related apparatus for geophysical exploration whereby the presence and specific location of scattered or concentrated metallic, mineral and carbon substances lying below the ground surface may be detected and identified with a degree of accuracy hitherto impossible.

An object of this invention is the provision of an electrical method and apparatus for geophysical prospecting employing the overvoltage effect or double layer charge effect at the surfaces of metallic, mineral and carbon particles suspended or embedded in a liquid medium.

An object of this invention is the provision of an electrical method of geophysical exploration which method comprises impressing a D. C. charging current through the ground between spaced charging electrodes, interrupting the charging current after a predetermined time interval, and measuring the resultant discharge potential due solely to the double layer charge effect at solid particles suspended in a liquid medium.

An object of this invention is to provide a method of measuring the overvoltage or double layer charge effect at solid particles suspended or embedded in a liquid medium as a result of a charging field impressed through the electrolyte.

An object of this invention is the provision of a method and apparatus for indicating the presence of free metals and conducting metallic compounds in a medium consisting entirely or in part of a conducting solution of water and soluble metallic salts.

An object of this invention is the provision of apparatus for geophysical prospecting and comprising means for impressing a flow of D. C. current into the ground, means for detecting the overvoltage or double layer potential at subsurface particles and timing means effective to cause operation of the detecting means a predetermined time interval after the flow of charging current has been cut off.

An object of this invention is the provision of apparatus for geophysical exploration said apparatus comprising means for impressing a pulse of D. C. current through a given volume of ground, means for measuring and recording the resultant potential due to the double layer charge effect manifest at the surface of metallic particles embedded in a liquid medium and means effective to eliminate unwanted transients resulting from effects other than the double layer charge phenomenon whereby data thus obtained may be evaluated in terms of specific subsoil conditions.

An object of this invention is the provision of apparatus for geophysical prospecting said apparatus comprising a high voltage source, means for impressing the voltage of the source across spaced charging electrodes along the ground surface thereby establishing an electric field through the ground, an electronic amplifier having its input terminals connected to spaced pick-up electrodes disposed in the ground and between the charging electrodes, means effective periodically to remove the electric field, means effective to reduce the amplifier gain to zero during the period when the electric field is established, means effective to open the amplifier gain a predetermined time after the establishment of the electric field, and means for indicating the output of said amplifier.

These and other objects and advantages will become apparent from the following description when taken with the accompanying drawings which illustrate the principles of operation and apparatus suitable for practicing the invention. It will be understood the specific detailed description of the illustrative apparatus and method is not intended to limit the invention beyond the terms of the claims appended hereto.

In the drawings wherein like characters denote like parts in the several views:

Figure 1 illustrates the electrolyte polarization phenomenon;

Figure 2 shows the relative nature of the applied and general polarization fields of the Fig. 1 arrangement after a given time interval;

Figure 3 illustrates the overvoltage or double layer charging phenomenon at particle surfaces;

Figure 4 shows the relative nature of the applied, general polarization and double layer fields of the Fig. 3 arrangement;

Figure 5 is a table showing maximum overvoltage values for certain metals when the electrolyte is $2N.H_2SO_4$ at 25° C. and at various current densities;

Figure 6 illustrates factors employed in developing the formula with respect to the potential of a point P outside the surface of a metallic particle and due to the double layer charge;

Figure 7 illustrates the factors employed in developing the formula for the electric field components as related to a spherical particle in a field of uniform current flow;

Figure 8 illustrates type curves for developing the formula for the overvoltage potential at a point P;

Figure 12 is a block diagram illustrating, in a broad sense, the adaptation of our apparatus to the measurement of double layer charge effects resulting at particle surfaces.

Figure 13 is a wiring diagram of the power supply;

Figure 15 is a wiring diagram of the amplifier circuit; and

*Background discussion*

Figure 9:
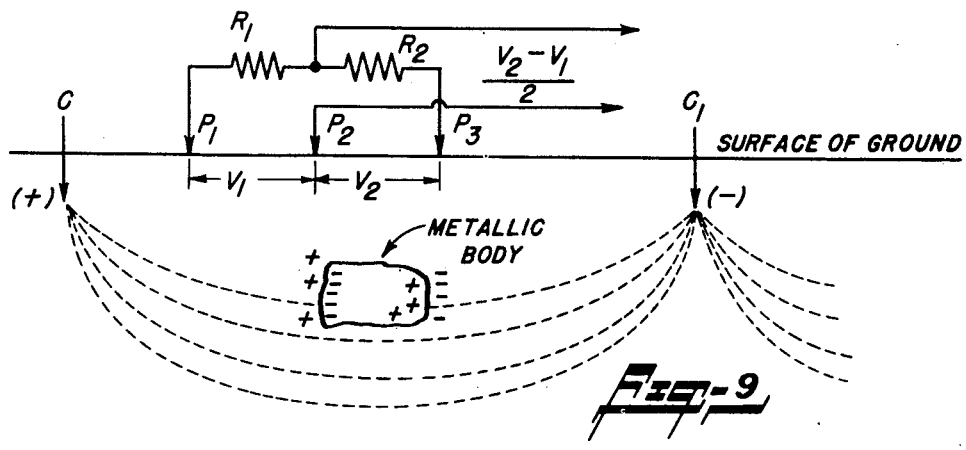
Figure 9 illustrates a simplified arrangement to explain the fundamental development of apparatus adapted for use in practicing our method of geophysical exploration.

A D. C. current applied to a slightly porous earth of a series of rock strata permeated by an electrolyte gives rise to polarization defined as the migration of the electrolyte charges in such fashion that the positive (+) ions move toward the negative (—) electrode and the minus (—) ions move toward the positive (+) electrode. Thereby electrolyte concentrations are set up throughout the liquid and charge concentrations at the current electrodes. This condition is illustrated in Figure 1 wherein the current, or charging, electrodes 21 and 22 are immersed in the electrolyte and are connected to opposite sides of a battery 23. Since charges are transported, differences in concentration result which in turn gives rise to a potential difference. This results in a field being superimposed throughout the liquid medium in addition to the normal initially applied field. It is to be noted this general polarization field is directed in a sense opposite to the applied D. C. field.

When the normal field is removed, in a matter of microseconds, by opening of the switch 24, Figure 1, the electrolytic polarization will discharge in a matter of seconds in a direction opposite to the initial charging field. The dashed curve of Figure 2 illustrates the relative potential distribution of the general polarization field along the line between electrodes 21 and 22. Thus, a pair of pick-up electrodes 25, 26, Figure 1, in contact with the liquid will have a polarity reverse to the polarity of the charging electrodes 20, 21, as shown.

The discharging potential of polarization may be indicated or measured by suitable apparatus such as for example, the voltmeter 27 connected across the pick-up electrodes 25, 26. Various refinements in the apparatus employed to measure the polarization discharging potential have been proposed with the result that the slope of the discharging potential distribution can be determined. By extensive experimentation the character of the discharge potential is related to known conditions such that data obtained in the field may be employed as a guide to the determination of geological sub-soil conditions. However, as has been stated hereinabove, the degree of success which may be expected of electrical prospecting methods depends upon the ease with which interfering factors may be eliminated from the final, measured values. In this respect the electrolyte polarization method of geophysical exploration fails as the results obtained give no special significance to important factors which we have found are directly related to general, sub-soil conditions, and as will now be explained.

*Overvoltage or double layer charge effects*

In addition to the general electrolytic polarization effect, above described, an effect known as the overvoltage, double layer charging or induced polarization effect may take place at discrete metallic particle surfaces when such particles are embedded in a medium containing an electrolyte and are subjected to an electrical field. In general, it may be added, these particles are better conductors than the surrounding medium.

As shown in Figure 3, a D. C. charging field will induce, in a good conducting metallic particle, charged surfaces with the positive (+) surface nearer the minus (−) current electrode. To this positive (+) surface of the particle negative (−) ionic charges will be drawn. For all practical purposes any two metallic particles and an electrolyte between them will form a simple electrolytic cell. If the charging current is now removed the overvoltage effect or double layer charge effects at particle surfaces will discharge in a matter of tenths of a second, the discharge being represented by the neutralizing flow of negative ions from the negative region of the solution near one side of the metallic mass to the positive region of the other side of the metallic mass. The discharge of the overvoltage effect may be likened to the discharge of a leaky condenser. Thus, during the discharge portion of the cycle the polarity of the pick-up electrodes 25, 26 will be as shown in Figure 3, from which it will be noted that the discharge potential due to this overvoltage or double layer effect is in the same direction as the initial charging field, as distinguished from the discharge potential due to general electrolytic polarization, the latter being opposite to the initial charging field. Figure 4 illustrates the relative voltage distribution along the line between the electrodes 21 and 22 due to the applied normal field, the general polarization field and the overvoltage effect. The method to be described is designed to balance out the general electrolytic polarization and measure only the double layer charge effects at the particle surfaces.

Metallic and mineral substances are often found in the ground in the form of sulphides. These sulphides, as well as carbon, form relatively good electrical conductors. It is known that most rock formations below the water table are fairly well saturated with moisture. Even the rock and soil formations above the water table may contain a certain amount of moisture residue adhering to the deliquescent clay particles of rock and soil. Thus, there may be present under the ground surface a medium consisting in part of a conducting solution of water and soluble metallic salts. We employ the overvoltage or double layer charge effect to detect and locate free metals and conducting metallic compounds. The apparatus employed for charging selected areas of the earth and for obtaining overvoltage indications is such that the data obtained therefrom is possible of interpretation to determine the specific mineral or metal lying hidden below the ground surface and the presence of which could not be ascertained by prior methods and apparatus employed in this field.

There now follows a more detailed discussion of the double layer charging effect. When a metallic particle is placed in an electrolyte containing metallic ions a potential difference across the particle-solution interface immediately develops measured by the work done to remove a metal ion into the solution. Actually four steps can be considered as involved in the process. If the solution pressure of the metal is great, positive ions will tend to go into solution and build up a positive layer around the metallic particle leaving a negative layer on the metal. If the osmotic pressure of the metallic ions in the solution is larger, positive ions will deposit on the metal making a positive layer here and leaving a negative layer in the adjacent solution. In either case an electrical double layer is formed. This explanation, in general terms can be expanded by classical physical or quantum mechanic considerations.

Now, if a current starts to flow ions migrate through the electrolyte but practically no ions succeed in crossing the double layer. The result of the flow of current is thus to increase the charge on each side of the double layer and, therefore, to increase the potential difference across the metallic particle-solution boundary. An abnormally charged double layer results; that is, there is an increased potential drop (overvoltage) across the metallic particle-solution interface.

The double layer charging or overvoltage will increase either until the applied field at the metallic particle-solution interface balances the applied external field, or until the overvoltage potential is reached at which electrolytic decomposition occurs. Since in most field applications the applied field (voltage gradient) is small, the former condition will likely result.

The metals may be grouped in the order of their overvoltage effects. Such a table showing a decreasing overvoltage of metals in a solution of $2N.H_2SO_4$ is illustrated in Figure 5.

Various factors affect the overvoltage phenomenon or are of significant interest with respect thereto to warrant consideration when interpreting the results obtained by our apparatus in order to identify properly the specific nature of the sub-soil deposit.

1. The overvoltage varies directly with the current density.

2. The overvoltage varies with time of current flow.

3. The overvoltage for nearly all substances approaches a limiting value of approximately 1.3 volts.

4. The overvoltage effect shows little variation with the hydrogen ion concentration of the solution.

5. Minute quantities of impurities in the solution or the metal-solution interface affect the overvoltage.

6. The overvoltage increases with temperature.

7. The presence of colloids increases the overvoltage.

8. If the surface of the metal particle is roughened the overvoltage decreases since the current density decreases.

Mathematical formulation

We shall now proceed to a mathematical formulation of the overvoltage effect. The true current density will vary over the surface of the metal particle and as we are interested in the region of small current densities we apply a correction factor as indicated below. The treatment to follow will consider the electromagnetic field associated with the charging current as being set up and decaying instantaneously. This is justified since the time of decay of the field is in the order of microseconds in the usual case whereas the decay of the overvoltage is found to be in the order of tenths of a second.

We assume that when the electromagnetic field is established current flows in accordance with Ohm's law in the solution and through the metallic particles in the solution.

As previously stated, it is found that the overvoltage at a point on a metallic surface increases linearly with time when a steady D. C. current is first caused to flow through the interface. This is interpreted as meaning that the first part of the current flow goes entirely toward establishment of the double layer charge at the interface between the metal and the solution. Often it is found that the apparent area of a surface is somewhat less than the true area because of minute crevices, etc., in the surface. Suppose we denote by $a$ the ratio of apparent to true surface area of the metallic particle. Then $a$ is always less than unity (1). If $i$ equals the apparent surface density of current then $ai$ equals the real surface density. Now assume the field has been established for a time $t$; then the total surface charge per unit area (of effective surface) brought up to the surface (positive (+) charge from one side of the double layer and a negative (−) charge from the other) is $\rho = ait$. If $l$ be the separation of the charges on the double layer then $l\rho = \tau = ailt$ where $\tau$ equals the moment of the double layer per unit area. The potential difference across the double layer will be:

$$V = -\frac{4\pi\tau}{\epsilon} \qquad (I)$$

where $\epsilon$ is the dielectric constant of the medium in which the double layer is set up.

Thus, after a time $t$ has elapsed the overvoltage built up will be given by:

$$V = -\frac{4\pi\alpha}{\epsilon} lit \qquad (II)$$

This overvoltage does not increase indefinitely with time; however, for each value of $ai$ there is a limiting value of V obtainable. The relation between apparent current density and overvoltage (measured in volts) is expressed as:

$$i = Ke^{-bV} \qquad (III)$$

where the constant $b$ is found to be approximately $$\frac{F}{2RT} \qquad (IV)$$

in which $F$ = Faraday's number,
$R$ = universal gas constant, and
$T$ = absolute temperature of the solution.

This relation holds fairly well for rather large values of $i$. For small current values Equation III, above, gives large values of V instead of corresponding small values and hence for our purposes the equation breaks down. If, however, we write Equation III as:

$$i = K(e^{-bV} - 1) \qquad (V)$$

or $$i + K = Ke^{-bV} \qquad (VI)$$

we shall not have changed the equation a great deal for large values of $i$ since K is a small factor and also we shall have $V = 0$ for $i = 0$; as found experimentally.

We may, then, rewrite Equation III in inverted form as:

$$V = -\frac{1}{b} \log \frac{i}{K} \qquad (VII)$$

and Equation V in inverted form as:

$$-\frac{1}{b} \log \left[1 + \frac{i}{K}\right] \qquad (VIII)$$

The time required for the overvoltage to build up to its maximum value is given by equating Equations II and VIII for V and we get:

$$t_0 = \frac{RT}{2\pi F\alpha li} \log \left(1 + \frac{i}{K}\right) \qquad (IX)$$

where $t_0$ equals the time of build up of the overvoltage.

Now suppose the applied E. M. F. is removed. We assume now that the only current flowing across the double layer is one tending to discharge it and formed of the charge of the original layer. As before we have:

$$V = \frac{4\pi\tau}{\epsilon}$$

and differentiating this with respect to time we obtain $$\frac{dV}{dt} = \frac{4\pi}{\epsilon} \frac{d\tau}{dt} = \frac{4\pi}{\epsilon} \alpha li = Ci \qquad (X)$$

where $$C = \frac{4\pi}{\epsilon} \alpha l$$

Now let us assume that on the decay the relationship expressed in Equation IX holds. This is strictly without justification theoretically but for larger values of $t$ the results based on this supposition are found to be borne out experimentally. Substituting for $i$ from Equation V we have:

$$\frac{dV}{dt} = CK(e^{-bV} - 1) \qquad (XI)$$

Integrating this we obtain:

$$[1 - e^{bV}] = [1 - e^{bV_0}]e^{-bCKt} \qquad (XII)$$

where $V_0$ is the overvoltage value when the applied E. M. F. was removed i. e., at $t = 0$.

For small $bV_0$ and hence correspondingly smaller $bV$, we have, to a first approximation:

$$V = V_0 e^{-bCKt} = V_0 e^{-\frac{t}{\beta}} \qquad \text{(XIII)}$$

where $\beta$ = time constant of decay of the overvoltage.

$$\beta = \frac{1}{bCK} = \frac{1}{2\pi\alpha lK} \frac{RT}{F} \epsilon \qquad \text{(XIV)}$$

For K small $\beta$ is large and also the overvoltage is large; hence a larger overvoltage metal should have a slower rate of decay than one with a smaller overvoltage (for identical $\alpha l$). A very rough metal surface ($\alpha$ small) will have a larger time constant than a smooth sample of the same metal, and also a lower overvoltage because of the difference between apparent and true current densities.

Domains of application of formulae

When a known current is passed for a certain length of time through the interfaces between the electrolyte and the metal particles the overvoltage value at the end of this interval will depend on whether or not the overvoltage has had time to build up to its maximum value for that particular current density. If it has not then we say we are working in the "time unsaturated region" of the overvoltage-current-time surface and the relation between overvoltage and time $t$ can be expressed as $$V = -Est \qquad \text{(XV)}$$

where
E is the electrical field normal to the interface;
$s$ is some positive constant $= \dfrac{4\pi\alpha l\sigma}{\epsilon}$ and
$t$ is the time the field has been established.

The transformation from Equation II to XVI is accomplished by noting that $i = \sigma E$ where $\sigma$ is the conductivity of the electrolyte rock medium.

If, however, the overvoltage has had time to reach its maximum value for a given current then we say we are working in the "time saturated region" and Equations V and VIII will apply.

General procedure for solution of overvoltage problems

The general procedure to be followed in the solution of any interrupted direct current overvoltage problem is as follows.

(a) Solve the corresponding stationary current case wherein current flows through the electrolyte and the metal objects therein in accordance with Laplace's equation only.

(b) If we may assume that the pulse duration time is so small that we are working in the "time unsaturated region" then we can use Equation XV to obtain the values of the overvoltages on the cathodic and anodic faces of the metal particle.

(c) If we are working in the "time saturated region" then Equation VIII applies.

In either case (b or c above) once we have the distribution of the overvoltage over the metallic body we can, assuming it to be caused by a double layer of charge, obtain the double layer moment or strength $\tau$ from the relation $$\tau = \frac{\epsilon}{4\pi} V$$

(d) When the inducing current is removed the overvoltage decays according to Equation XII or XIII and since experimentally this is found to be of the order of a few tenths of a second we shall assume we can use quasi-stationary theory again.

(e) Referring to Figure 6, if $\tau$ be the surface double layer charge moment of the element of area $da$ with outward normal $$\vec{n}$$

(a positive $\tau$ will indicate a negative charge on the negative side of the surface and a positive charge on the positive side with reference to the direction of the charging field) then the potential at point P outside the surface due to the double layer element on $da$ is $$d\phi = \frac{\tau}{\epsilon}\vec{n}\nabla\left(\frac{1}{r}\right)da \qquad \text{(XVI)}$$

where $\Delta$ is taken at the point of observation P.

Therefore, the potential at P due to all the double layer distributions is $$\phi = -\int_s \frac{\tau\vec{n}}{\epsilon}\nabla\left(\frac{1}{r}\right)da = \frac{1}{\epsilon}\int_s \frac{\tau\vec{n}\,\vec{r}}{r^2}da \qquad \text{(XVII)}$$

where $s$ includes all surfaces which have double layers.

Approximation for small current flow

From Equation VIII we have, for the time saturated case, $$V = -\frac{1}{b}\log\left[1 + \frac{1}{K}\right] \approx \mp \frac{i}{bK}$$

for small $i$ $$= \pm \frac{\sigma E}{bK}$$

where $\sigma$ is the conductivity of the electrolyte and E is the normal electric field into the metallic surface.

In the time unsaturated region we have $$\tau = -\frac{\epsilon}{4\pi}V = +\frac{\epsilon}{4\pi}stE$$

$$= \frac{\epsilon}{4\pi}\frac{4\pi\alpha l\sigma}{\epsilon}tE = \alpha l\sigma tE = AE$$

If $t$ is a constant pulse duration then A is a positive constant as well.

In the time saturated region we have, for small current densities $$\tau = -\frac{\epsilon}{4\pi}V = \frac{\epsilon}{4\pi}\frac{\sigma}{bK}E = BE$$

where B is a positive constant, $$= \frac{\epsilon\sigma}{2\pi}\frac{RT}{FK}$$

It is worthy of note that E is the normal field into the metal and $\tau$ is positive if there is a layer of positive charge farthest from the metal and a layer of negative charge nearest the metal.

Application of method to geophysical prospecting

Metallic sulphides are generally good conductors and when in contact with ground water and a current is caused to flow through the region overvoltage and double layer charge effects will be set up. The best way of detecting the overvoltage is through interruption of the inducing field and measurement of the transient decay field.

In order to predict what overvoltage effects are to be expected from a given volume of rock containing disseminated sulphides we make certain simplifying assumptions. Since it would be impossible to solve the current distribution problem for a general form of particle we shall assume that the particles under consideration are spherical in form. Secondly, these particles are assumed to be uniformly disseminated throughout the mass of rock. Lastly, not the whole surface of each metallic particle will be in contact with the electrolyte. For example, if the rock have $p\%$ porosity then only $$\left(\frac{P}{100}\right)^{2/3}\%$$

of the available metallic surface will be in contact with the electrolyte.

In the treatment to follow we shall, however, consider that the particles are everywhere in contact with the electrolyte. To reduce this case to a practical case we must multiply the results obtained by a factor $p^{2/3}$ where $p$=percentage by volume of the rock occupied by the electrolyte (ground water or connate water).

*Case of a spherical particle in uniform current flow*

Refer to Figure 7.

Let the particle have a radius, $a$, and conductivity $\sigma_1$ and be imbedded in an electrolyte of conductivity $\sigma_0$. The potential function in the region exterior to the sphere is $$\psi = -E \cos \theta \left[ r + \frac{\sigma_0 + \sigma_1}{2\sigma_0 + \sigma_1} \frac{a^3}{r^2} \right] \quad \text{(XVIII)}$$

where E is the uniform field in which the sphere is placed.

The normal component of the electric field over the sphere is, then, $$\left(\frac{\partial \psi}{\partial r}\right)_{r=a} = E \cos \theta \left[\frac{3\sigma_1}{2\sigma_0 + \sigma_1}\right] \quad \text{(XIX)}$$

which, we must remember, is the outward field component.

The inward field component is given for $$\theta \leq \frac{\pi}{2}$$

by $$E_i = -\frac{3\sigma_1}{2\sigma_0 + \sigma_1} E \cos \theta \quad \text{(XX)}$$

and the outward field component for $$\theta \leq \frac{\pi}{2}$$

by $$E_0 = \frac{3\sigma_1}{2\sigma_0 + \sigma_1} E \cos \theta \quad \text{(XXI)}$$

In the time unsaturated region we have for the double layer strength $$\tau = -\frac{\epsilon}{4\pi} st \frac{3\sigma_1}{2\sigma_0 + \sigma_1} E \cos \theta = -m \cos \theta \quad \text{(XXII)}$$

where $$m = +\frac{\epsilon}{4\pi} \frac{3\sigma_1}{2\sigma_0 + \sigma_1} Est$$

which holds for $0 \leq \theta \leq \pi$.

In the time saturated region $$\tau = -\frac{3\sigma_1}{2\sigma_0 + \sigma_1} \frac{\epsilon}{4\pi} \frac{\sigma}{bR} E \cos \theta = -m \cos \theta \quad \text{(XXIII)}$$

where $$m = +\frac{3\sigma_1}{2\sigma_0 + \sigma_1} \frac{\epsilon}{4\pi} \frac{\sigma}{bR} E$$

Suppose the point at which we are measuring the potential is a distance $r$ from the center of the particle and inclined at an angle $\theta_0$ to the direction of the field E. By applying the Formula XVII, above, integrating over the surface of the sphere and evaluating to the first power of (i. e. to the order of)

$$\frac{a}{r}$$

we have $$\phi = -\frac{m\delta}{3\epsilon} \frac{\cos \theta_0}{r^2} \quad \text{(XXIX)}$$

where $\delta$ is the surface area of the particle.

Thus, each spherical particle gives rise to a potential disturbance which is equivalent to that of a dipole of strength, $$M = +\frac{m\delta}{3\epsilon}$$

and with axis oppositely directed to the field.

If we have a volume density of $n$ such particles per unit volume, and if these particles are separated by distances large compared to their radii then at an external point the overvoltage potential is $$\phi = \int_{VOL} M' \frac{\vec{E} \cdot \vec{r}}{r^2} dv \quad \text{(XXX)}$$

where $M' = M\delta$.

Thus we see that the potential indications due to metallic particles in the overvoltage method decreases as the inverse square of the distance.

*Type curves and interpretation*

A practical method of interpretation may be based on type curves, that is, theoretical curves representing the effects to be expected from specified geometrical distributions of metallic particles. Of particular interest because of its great adaptability is the case of a tabular body in a uniform field. This is supposed to have infinite strike length in the Y direction.

Consider the case of metallic sulphide scattered in a tabular dipping body as shown in Figure 8. A uniform field E is considered acting parallel to the X axis and perpendicular to the strike of the body. The field at any point P arising from the double layer charging effects will be $$E_{o.v.} = 2ME \int_x \int_z \frac{X^2 - Z^2}{r^4}$$

$$= 2ME \left[\sin^2 d(\theta_3 - \theta_4 - \theta_1 + \theta_2) + \sin d \cos d \log \frac{r_3 r_2}{r_1 r_4}\right]$$

If now, a pair of pick-up electrodes $P_1$, $P_2$ are inserted into the ground in the vicinity of the metallic sulphides the voltage drop occurring between the electrodes will be $E_{o.v.}$ multiplied by the distance $P_1P_2$ between the electrodes, or $$2ME[\sin^2 d(\theta_3 - \theta_4 - \theta_1 + \theta_2) + \sin d \cos d \log \frac{r_3 r_2}{r_1 r_4}]P_1P_2$$

The variation of $E_{o.v.}$ across the body is shown by the solid curve of Figure 8.

In the actual practice of our invention we employ an array of three (3) pick-up electrodes $P_1$, $P_2$ and $P_3$, the electrodes being uniformly spaced along the ground surface; the overvoltage $$P_3P_2 = P_2P_1 = \frac{V_2 - V_1}{2}$$

being recorded after removal of the energizing field arising by virtue of the charging current flowing through the earth. The curve of the overvoltage $$\frac{V_2-V_1}{2}$$

computed with respect to the body of Figure 8 is shown by the upper dotted curve of Figure 8.

*General method for detecting double layer effects*

Figure 9 is a simplified diagram to illustrate our method of geophysical exploration. An electrical field is established across an expanse of earth by the charging electrodes C, $C_1$ having the indicated polarity when connected to a suitable source of D. C. voltage. As explained hereinabove, the charging field gives rise to the double layer charge effects at the surface of a metallic particle or body. The external charging field is then cut off and the double layer charge effect will dissipate itself in a matter of tenths of a second. The decay of the double layer charge is detected by an arrangement of pick-up electrodes $P_1$, $P_2$, $P_3$; $P_1$ being positive with respect to $P_2$, and $P_2$ being positive with respect to $P_3$. When the outer pick-up electrodes are connected together by high ohmage resistors $R_1$ and $R_2$ of equal value, the resultant voltage appearing across the midpoint of the resistors and electrode $P_2$ will be $$\frac{V_2-V_1}{2}$$

As the resultant voltage depends upon the relative location of the pick-up electrodes with respect to the sub-surface metallic body, a resultant voltage of zero (0) is indicative of one of three possible conditions:

1. Absence of any metallic mass within the region defined by the downward projection of the pick-up electrodes; or
2. A substantially uniform mass extending beyond the limits of the outer electrodes $P_1$ and $P_3$; or
3. The center electrode $P_2$ lies over the center of a metallic mass which mass does not extend beyond the limits of the outer electrodes $P_1$, $P_3$.

The third condition, above, is of primary interest as will become more apparent hereinbelow.

Figure 10:
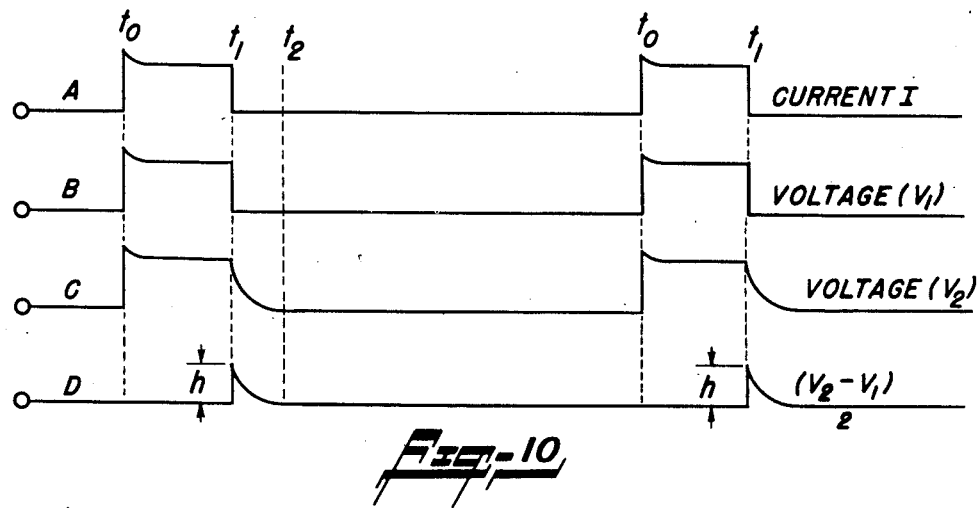
Figure 10 illustrates a series of curves applicable to the arrangement of Figure 9.

Figure 10 illustrates graphically the relative relation between the charging current sent through the ground and the potentials appearing across the pick-up electrodes in the arrangement shown in Figure 9. Curve A shows the charging current flowing through the ground from the time $t_0$ to time $t_1$ after which the charging current is cut off until the next pulse is applied some time later. Curve B shows the potential $V_1$ appearing across the pick-up electrodes $P_1$, $P_2$ which, it will be noted, lie beyond the range of the metallic body (see Figure 9). The potential $V_1$ results from the IR drop across the earth between electrodes $P_1$, $P_2$ and, therefore, the curve B follows the curve A exactly. However, the potential $V_2$ appearing across the pick-up electrodes $P_2$, $P_3$ (curve C) includes, in addition to the IR drop component which is equal to $V_1$ (curve B), a residual component resulting from the double layer charge effects at the surface of the metallic mass lying between said electrodes $P_2$, $P_3$. As the double layer charge effects dissipate in a matter of tenths of a second the curve C includes a decaying potential from the time $t_1$ (when the charging current has been cut off) to time $t_2$, it being again pointed out that the decaying potential due to the double layer effect is in the same direction as the charging current. If we now subtract $V_1$ from $V_2$ the resultant potential will be indcated by the curve D. It will be noted that by subtracting, or bucking, the potentials $V_1$ and $V_2$ we eliminate all undesired voltage components as such components will, in most cases, be equal and of like direction between the equally spaced pickup electrodes $P_1$, $P_2$ and $P_2$, $P_3$.

Figure 11:
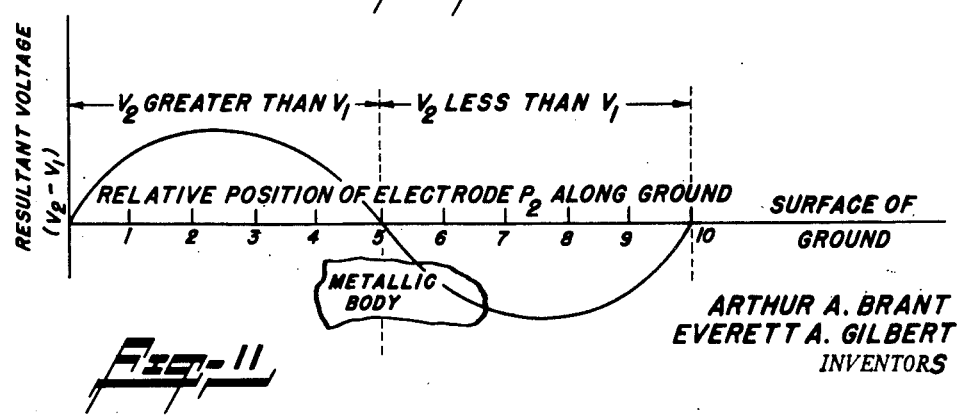
Figure 11 is a plot of the overvoltage effect with respect to equal displacements of the electrode system along the ground and showing how our method determines the center of a subsurface mass.

The peaks $h$ appearing on the resultant potential curve D represent the potential arising solely by reason of the double layer charge effects at the surfaces of the sub-surface metallic mass or particles. If now the pick-up electrodes be moved to the right in the Figure 9 arrangement the resultant peaks $h$ will become somewhat smaller in height by reason of the fact that the pick-up electrodes $P_1$, $P_2$ approach the region of metallic body and the potential appearing across these electrodes will include a component of the double layer charge. If, then, we plot the resultant potential $V_2-V_1$ (peaks $h$ in curve D) against equal and known displacements of the center pick-up electrode $P_2$ we obtain a curve as illustrated in Figure 11. The point at which this curve crosses the zero axis indicates the precise location of the center of the metallic mass. The importance of such information in geophysical exploration is obvious.

Referring again to curve D, Figure 10, the height of the peak $h$ and the character of the decay curve are indicative of the nature and composition of the sub-surface metallic particles. The use of type curves, as explained hereinabove, enables us to compute the expected double layer charge effects for various metallic particles lying at various distances below the surface of the ground. By correlating such data with experimental results obtained in the laboratory under known and controlled conditions we can adjust our apparatus such that the curves (curve D, Figure 10) obtained in field tests can be interpreted in terms of specific geological information.

*Specific apparatus*

We shall now describe in detail apparatus adapted to the practice of our method of geophysical exploration.

Figure 12 is a general block diagram of the apparatus. The D. C. power supply is energized from a suitable alternating power source and is connected on the output side to the two charging electrodes C, $C_1$ inserted into the ground. The power supply is provided with suitable means to provide zero to several amperes at a potential up to approximately 4,000 volts D. C.

In general the pulser-multivibrator controls the operation of a high voltage relay in the power supply which relay opens and closes the current circuit to the charging electrodes. The operation of thte pulser multivibrator is adjustable such that the charging current can be made to flow through the earth at regular intervals of time varying from .05 to 2.0 seconds and occuring at a rate which allows more time "off" than "on"; the proportion of "off" and "on" time being also adjustable as desired.

Pick-up electrodes $P_1$, $P_2$ and $P_3$ are equally spaced along the ground within the limits of the charging electrodes and are connected to the D. C. amplifier through the equal and high ohmage resistors $R_1$ and $R_2$. The ohmic value of resistors $R_1$ and $R_2$ is high compared to the resistance of the pick-up electrodes $P_1$, $P_2$, $P_3$ and when connected as shown in the block diagram the input to the D. C. amplifier will be $$\frac{V_2-V_1}{2}$$

Also, the pick-up electrodes preferably are of the non-polarizing silver chloride or copper sulfate type commonly used in the art of geophysical exploration. A recorder is connected to the output side of the amplifier.

An arrangement commonly identified as a clipper circuit is connected to the D. C. amplifier and the pick-up electrodes. Its purpose is to block the D. C. amplifier so that no indications will appear on the recorder during the period when the charging current is flowing through the earth. However, when the charging current is cut off the clipper circuit instantly permits the amplifier to open up whereby the potential difference $$\left(\frac{V_2-V_1}{2}\right)$$

appearing across the pick-up electrodes is registered on the recorder in the form of the curve D, of Figure 10. By employing an arrangement of this type extraneous and undesired potentials arising by reason of the flow of charging current through the earth are eliminated from the recorder. Further, the clipper circuit is so arranged that the amplifier becomes effective the instant the charging current is removed, which is essential as the decay of the double layer charge effect occurs in a matter of tenths of a second.

A detail description of the various components identified in the block diagram of Figure 12 now follows.

Figure 13 is a wiring diagram of the power supply. The primary winding of a high voltage transformer 30 is connected to a variable autotransformer 31 thereby providing an arrangement whereby the voltage on the secondary side of the high voltage transformer can be varied from 0 to 8000 volts. Rectifier tubes 32 and 33, which may be type 872, are connected as a conventional full wave rectifier including a choke input filter comprising the inductance 34 and the condenser 35. The filaments of the tubes are energized by a separate step down transformer 36. A bleeder resistor 37 connected across the output of the rectifier circuit may be employed to improve the regulation of the circuit as a whole. Inserted in the rectified D. C. output circuit is a high voltage, vacuum relay 38 having a set of cooperating contacts 39 and 40. When the contacts 39, 40 are closed the D. C. charging current flows through the charging electrodes. Operation of the relay contacts is controlled by the current flowing in the relay operating coil 41 which is connected in the output side of a pulser-multivibrator now to be described. A voltmeter 42 and an ammeter 43 are inserted in the circuit to the charging electrodes to indicate the value of the voltage and current during the periods when charging current is flowing through the earth.

Figure 14:
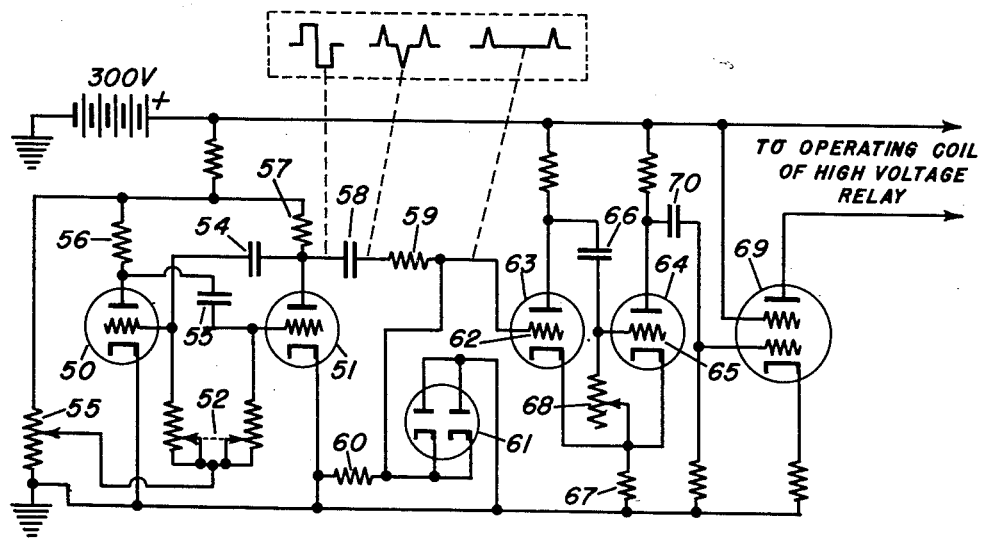
Figure 14 is a wiring diagram of the pulser-multivibrator.

The wiring diagram of the pulser-multivibrator is shown in Figure 14. The vacuum tubes 50 and 51, which may be type 6SN7 or equivalent, are connected as a multivibrator oscillator the frequency of which can be varied from 5 cycles per second to 1 cycle every 5 seconds by means of the dual adjustable resistor 52 and the timing condensers 53 and 54 cross connected between the plates and grids of the tubes 50, 51. One free end of the dual resistor 52 is connected to the grid of the tube 50 and the other free end to the grid of the tube 51 while the joined ends of said resistor 52 are connected to the adjustable arm of the resistor 55 connected between ground and the two plate dropping resistors 56 and 57. The bias of the multivibrator is set at a positive value by the resistor 55 to assure stable operation.

The square wave pulses from the plate of tube 51 are differentiated by the small condenser 58 and the grid resistors 59, 60 and the negative peaks of the differentiated pulses are by-passed by the diode vacuum tube 61. The shapes of the electrical pulses passing through this portion of the circuit are shown in the area within the dotted lines on the upper part of Figure 14. From this it will be noted only short positive pulses are applied to the grid 62 of the vacuum tube 63, the latter, together with a similar type 6SN7 tube 64, being arranged as a one shot multivibrator. The positive pulse appearing on the grid 62 lowers the voltage on the cooperating plate of the tube 63 and, therefore, results in a decreased voltage on the grid 65 of the tube 64 due to the coupling condenser 66. This decrease in the voltage cuts off the current flow in the plate of the tube 64 and lowers the voltage drop across the cathode resistor 67 thereby increasing the relative positive voltage on the grid 62 of the tube 63 until the tube 64 is entirely cut off. Tube 64 remains cut off until the condenser 66 discharges through the adjustable resistor 68, at which time the circuit returns to the initial condition ready for the next short timing pulse to be applied to the grid 62. Each positive pulse appearing on the grid 62 results, therefore, in a voltage pulse on the plate of tube 64 the length of which can be varied by the adjustable resistor 68, and the frequency of which depends upon the frequency of oscillator section of the circuit. The output of the plate of tube 64 is coupled to the grid of the tube 69 by the coupling condenser 70. Inasmuch as the operating coil of the high voltage vacuum relay (see Figure 13) is connected in the output side of the tube 69 (as indicated by the legends) the vacuum relay will close and open the circuit to the charging electrodes C, $C_1$ (Figure 13) in exact correspondence with the output pulses of the pulser-multivibrator.

Figure 15 is a wiring diagram of the D. C. balanced amplifier. The amplifier is of the stable, direct coupled type the gain of which can be varied between zero and 1,000 without affecting the indication of a direct inking type of recorder connected to the output circuit. This is accomplished by a series of balanced bridge tube circuits.

The pick-up electrode arrangement described with reference to Figure 9 is shown in the upper left corner of Figure 15, the electrodes being identified as $P_1$, $P_2$ and $P_3$. The potentials arising by virtue of the double layer charge effects are picked up by the pick-up electrodes $P_1$, $P_2$, $P_3$ and the potential $V_1$ between the electrodes $P_1$ and $P_2$ is subtracted from, or bucked against, the potential $V_2$ between the electrodes $P_2$ and $P_3$ by the illustrated circuit including the equal resistors $R_1$ and $R_2$. Thus, a potential equal to all times to $$\frac{V_2-V_1}{2}$$

appears across the input terminals Ⓐ and Ⓑ of the amplifier circuit.

The 1½ volt battery 80 and the associated resistors 81, 82, 83 and 84 compose a variable voltage source and the voltage output of this network is, in practice, adjusted to equal and buck out the normal earth and electrode voltage occurring across the input terminals Ⓐ, Ⓑ of the amplifier before the charging current is applied through the ground. Thus, these undesired voltages are balanced or cancelled out of the circuit. As the amplifier has a directive sense with respect to input voltage, the amplifier output will represent the potentials arising by virtue of the double layer charge effects at the surfaces of sub-surface metallic bodies.

A switch 85 is composed of a movable blade adapted to establish contact with any one of three stationary contacts. As shown in the drawing the switch is closed in the position marked "Indicate" in which position the circuit is ready for use. When the switch is in the position marked "Calibrate" the amplifier input is connected to a standard voltage source 86, having a steady potential of 1.5 volts, connected across a voltage divider 87 which is so adjusted and arranged that .01 volt increments can be obtained therefrom. When the switch 85 is set to the position marked "Short" the amplifier is short circuited to ground under which condition no voltage should be evident at the output of the amplifier.

The resistor 88 is an input voltage divider that allows the overall voltage gain of the amplifier to be adjusted as desired.

The two tubes 89 and 90 (type 6K4) form a stable bridge circuit of no gain and low internal impedance to the grids 91 and 92 of the first amplifying bridge circuit composed of the two sections of the tube 93. The resistors 94 and 95 permit adjustment of the voltage levels of the grids of the tubes 93 and 90 respectively for zero output on the recorder when the switch 85 is set to the position marked "Short." The other arms of the input bridge comprise the resistors 96 and 97 which are connected to a $-19\frac{1}{2}$ volt bias, as shown. A battery 98 supplies the plate voltage for the input bridges.

The plate resistor 99 and the left side of the tube 93 form one arm of an amplifying bridge with the plate resistor 100 and the right side of tube 93 as the other arm. Resistor 101 provides a bias of 1.5 volts for the tube 93 and this resistor is also adjustable to set the D. C. voltage levels between the plates of the tube to about 22 volts. The gain of this bridge can be reduced to zero without causing a voltage difference between the plates by increasing the voltage drop across the resistor 101 to 6 volts or more by the addition of a current from the clipper circuit through the connection to the terminal marked Ⓐ, or by allowing current to flow through the resistor 102 by closing the hand operated switch 102A.

A signal applied to the grid of tube 89 is amplified and appears between the plates of tube 93. This signal is then applied to the grids of the second amplifying bridge composed of the tube 103 and its supporting components. Resistor 104 is a dropping resistor adjusted to a value to obtain the proper voltage level across the plates of the tube 103 and the resistor 105 is a balancing resistor used to adjust the output at the recorder to zero when the gain is reduced to zero. The resistor 106 and the left side of the tube 103 compose one arm of an amplifying bridge and the resistor 107 and the right side of the tube 103 compose the other arm. A biasing voltage drop for the tube 103 is provided by the cathode resistor 108 and the resistor 109 lowers the gain and permits the amplifier to be calibrated against the standard voltage drops chosen from across the calibrating resistor 87.

The left side of tube 110 and resistor 111 together with the right side of said tube 110 and the resistor 112 form a bridge of unity gain and low internal impedance to drive the grids of a power bridge that energizes the recorder. This power bridge is composed of the tubes 113 and 114 and the resistance arms 115 and 116. The output voltage of the power bridge appears between the points Ⓒ and Ⓓ and the value of this voltage is indicated by a high speed recorder of the direct inking type and having a sine wave frequency response up to 100 cycles per second.

Figure 16:
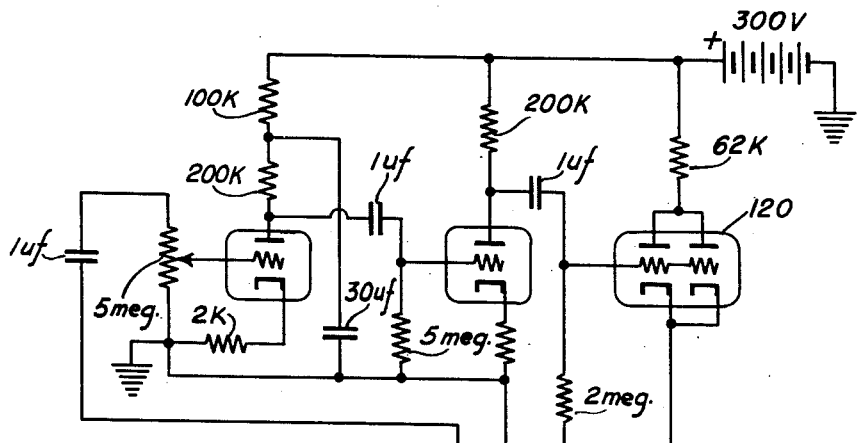
Figure 16 is a wiring diagram of the clipper circuit employed to reduce the amplifier gain to zero during the period when the charging current is flowing through the earth.

Figure 16 is a wiring diagram of the clipper circuit which provides the current to reduce the amplifier gain to zero during the time interval when the charging current is applied to the ground through the charging electrodes C, $C_1$ (see Figures 12 and 13). The circuit comprises a very low frequency capacity coupled amplifier of conventional design which obtains a positive signal from the pick-up electrodes $P_1$, $P_2$ as shown in Figure 15. This signal is amplified by the tubes of the clipper circuit and results in a corresponding positive current pulse from the tube 120 (Figure 16) which current pulse is used to block the amplifier gain during the period in which the charging current flows through the earth, as explained hereinabove with reference to Figure 15. The tube 120 is biased well beyond the cut-off point and the amplification gain of the clipper circuit is adjusted so that a voltage input in the order of 2 volts ($V_1$ of Figure 9) is required to actuate the clipper circuit. Inasmuch as the transient potentials arising by virtue of the double layer charge effects have a maximum theoretical value of 1.3 volts, the clipper circuit is not affected by such potentials. Thus, when the charging current is flowing through the ground, a voltage of something over 2 volts appears across pick-up electrodes $P_1$, $P_2$ (IR drop through ground) causing current to flow through the cathode of tube 120 (Figure 16) and resistor 101 (Figure 15) thereby reducing the gain of the amplifier to zero. The resistance-capacitance coupling network between the stages of the clipper circuit must have a time constant comparable to the period of the lowest frequency pulse used for charging the ground. While the pulses on the grids of the clipper circuit tubes may be peaked after passing the first stage, the pulses are essentially square waves on the plate of each tube. Consequently, the output current flowing in the cathode of the tube 120, and its cathode resistor 101, Figure 15, effectively is a rectangular pulse within the operating range of such tube. As soon as the charging current is cut off, the voltage input to the clipper circuit drops below the threshold required for operation of the clipper circuit; consequently no current flows through the cathode of tube 120 (Figure 16) and the amplifier gain instantly is returned to normal.

*General field operation*

The above described apparatus, together with a motor-generator set, may be carried in a truck for mobile field operations. The charging stakes and the pick-up electrodes are connected to the apparatus by flexible cables and are inserted into the ground at desired positions along a profile line of observation points. Self potentials, if any, existing at the pick-up electrodes are balanced out by means of the variable voltage source described with reference to Figure 15. A periodic D. C. charging current (controlled by the pulser-multivibrator of Figure 14) is sent through the earth between the charging stakes C, $C_1$ (Figure 12). During the period when the D. C. charging current is flowing through the earth the clipper circuit (Figure 16) blocks the amplifier such that any potentials existing across the pick-up electrodes during these periods do not appear on the chart of the recorder. However, the instant the flow of D. C. charging current is cut off the clipper circuit becomes ineffective and the amplifier (Figure 15) instantly responds to the voltage $$\frac{V_2-V_1}{2}$$

arising by virtue of the double layer charge effects developed at the surfaces of the sub-surface particles. The magnitude of this voltage may be measured by means of a ballistic galvanometer, oscillograph or direct inking pen type recorder.

The values of $$\frac{V_2-V_1}{2}$$

are plotted against positions of the center pick-up electrode $P_2$ (Fig. 11) and the magnitude, sign and shape of the obtained curve permit deductions to be made as to the possible width, depth, dip and metallic percentage of the causative mineral or metallic concentration. Also, the rate of decay of the $$\frac{V_2-V_1}{2}$$

curve may be related to laboratory tests to afford an indication of the specific metallic mineral present.

The herein described method of geophysical exploration is of equal validity when the pick-up electrodes $P_1$, $P_2$, and $P_3$ are not confined to a line joining the charging stakes C, $C_1$ or to an area within the limits of the charging stakes. In other words, the pick-up electrodes may be arranged in an angular array and such array can be inserted into the earth outside, or to one side, of the direct path of the charging current between the charging stakes. In such cases, the voltages $V_1$ and $V_2$ (due to the IR drop through the earth) will not, in general be of equal magnitude and the resultant curve $$\frac{V_2-V_1}{2}$$

(curve D, Figure 10) thus obtained requires the employment of a correction factor for proper geological interpretations.

Further, while the method and apparatus have been described with respect to an arrangement wherein the charging stakes and the pick-up electrodes are inserted into the ground at the earth's surface the invention is equally well adapted to making overvoltage measurements in drill holes and underground workings such as mines, caves, etc.

Having now described our invention in detail certain variations and modifications in the individual components and arrangement of the parts will be apparent to those skilled in this art. Such variations and modifications may be made without departing from the scope and spirit of the invention as set forth in the claims.

We claim:

1. The geophysical method of detecting the presence of sulphides in a medium permeated by an electrolyte said method comprising: inserting a pair of charging stakes into the earth at spaced points; inserting an array of three pick-up electrodes into the earth; applying a unidirectional charging current into the earth through the charging electrodes; interrupting said current within a time period of 30 seconds; and measuring the resultant transient potential appearing across pairs of said pick-up electrodes, said measurement being restricted to the transient potential having the same directive sense as the charging current and which decays to one half peak value within 0.5 second.

2. The invention as recited in claim 1, wherein the pick-up electrodes are arranged in line with each other and the charging stakes, and the pairs of pick-up electrodes are connected in electrical opposition.

3. The geophysical method of detecting the presence of sub-soil sulphide particles in scattered or concentrated state in a meduim permeated by an electrolyte said method comprising the establishment of an electrical field through the earth in the region of such particles to thereby establish double layer charge effects at the surfaces of such particles, interrupting said field, and measuring the transient potential arising solely by virtue of the double layer charge effects upon removal of the electrical field, said transient potential having a direction parallel to that of the charging field and decaying to one half peak value within 0.5 second.

4. The geophysical method of determining the center of a mass of sub-soil metallic or mineral particles in a medium permeated by an electrolyte said method comprising: the insertion of a first, second and third pick-up electrode into the earth in the vicinity of the said mass, said first and third electrodes being equally spaced from the second electrode and all electrodes being in line; connecting the first and second electrode in electrical opposition to the second and third electrode; sending a unidirectional current through the ground and through the mass; interrupting the current; measuring the resultant transient potential appearing across the oppositely connected pick-up electrodes when the current has been interrupted; uniformly moving the pick-up electrodes to a new position; and alternately repeating the procedure of interrupting the current flow, measuring the resultant transient and moving the pick-up electrodes until the indication across the oppositely connected pick-up electrodes is zero, under which condition the second pick-up electrode will be located directly opposite the center of the sub-soil mass.

5. Apparatus for geophysical exploration comprising a source of D. C. current, means for impressing a current flow from said source through the earth in the form of pulses, detecting means for detecting potentials existing within the earth's surface, and automatic means effective to prevent operation of the detecting means during the periods when the potentials exceed a predetermined magnitude.

6. Apparatus for geophysical exploration comtprising a source of D. C. current connected to a pair of charging stakes inserted into the earth, a relay having an operating coil and provided with a set of contacts connected between the source and one of the charging stakes, an electronic pulsing circuit controlling the energization of the relay operating coil, a set of pick-up electrodes inserted in the earth, detecting means connected to said pick-up electrodes to indicate transient potentials across said electrodes, and electronic means connected to said pick-up electrodes and to said detecting means said electronic means being effective to prevent operation of said detecting means when the voltage across the pick-up electrode exceeds a predetermined magnitude.

7. The invention as recited in claim 6, wherein the detecting means comprises a direct coupled balanced electronic amplifier having a recorder connected in the output circuit.

8. The invention as recited in claim 7, wherein the pick-up electrodes comprise three in number, a resistance connected across two of the pick-up electrodes, and the amplifier is connected to the third pick-up electrode and the center point of said resistance.

9. Geophysical exploration apparatus for detecting the sub-surface presence of scattered or concentrated metallic or mineral particles in a medium permeated by an electrolyte said apparatus comprising: a source of D. C. current connected to a set of charging stakes inserted at spaced points in the earth; means effective to cause current from said source to flow through the earth between said stakes in pulses having a predetermined length and frequency, thereby establishing double layer charge effects at the surfaces of said particles; an array of three pick-up electrodes inserted into the earth; a pair of resistors connected across the outer pick-up electrodes; a direct coupled electronic balanced amplifier connected between the mid-point of said resistors and the center pick-up electrode; means for indicating the output of said amplifier; an electronic clipper circuit having its input connected directly to the center pick-up electrode and one of the outer pick-up electrodes, and its output applied to the cathode resistor of the first balanced voltage amplification stage of the amplifier; the recited combination resulting in the clipper circuit reducing the gain of the amplifier to zero during periods when the D. C. current is flowing through the earth.

10. The invention as recited in claim 9, wherein the means effective to cause current flow from the source through the ground comprises an electronic pulser-multivibrator; and including a power relay having its operating coil connected to the output of said pulser-multivibrator and having a set of contacts connected between the source of D. C. current and one of the charging stakes.

11. The invention as recited in claim 10, and including means effective to adjust the output current of the pulser-multivibrator to pulses of predetermined length and frequency.

12. Geophysical exploration apparatus for detecting the presence of sub-surface metallic and mineral particles in a medium permeated by an electrolyte said apparatus comprising: a source of D. C. current; a set of charging stakes inserted into the earth at spaced points said stakes being connected to the source of D. C. current; a relay having a set of contacts connected between the source of current and one of said stakes; a combination electronic oscillator and multivibrator; circuit elements connecting the output circuit of the multivibrator to the operating coil of said relay; adjustable means for altering the frequency of said oscillator; means for adjusting the length of the current pulse in the output plate circuit of the multivibrator; an array of three pick-up electrodes inserted into the earth; a resistive component connected between the outer two pick-up electrodes; a direct coupled balanced amplifier having its input circuit connected across the center pick-up electrode and a point intermediate the ends of said resistive component; a source of fixed voltage; circuit elements for connecting the said source of fixed voltage to the input of the amplifier for calibrating purposes; means for applying an independent voltage of predetermined value to the input of said amplifier during periods when said input is connected to the pick-up electrodes; means connected in the amplifier output circuit for indicating the output of said amplifier; an electronic clipper circuit; circuit elements directly connecting the input of said clipper circuit between the center pick-up electrode and one of the outer electrodes; and means applying the output of said clipper circuit to the cathode resistor of the first balanced voltage amplification stage of the amplifier.

13. Apparatus for measuring the difference between two transient voltages each having a maximum predetermined value said apparatus comprising: a D. C. direct coupled balanced amplifier having an input and an output circuit; means connected in the amplifier output circuit to indicate the output of said amplifier; a first contact electrode; a second contact electrode; a third contact electrode; a resistive component connected across the first and third contact electrodes; circuit elements connecting the amplifier input circuit to the second contact electrode and a point intermediate the ends of said resistive component; an electronic clipper circuit arranged to produce an output current when the voltage applied to the input exceeds the maximum predetermined value of the transient voltages to be measured; circuit elements connecting the input of the clipper circuit across the first and second contact electrodes; and circuit elements connecting the output of the clipper circuit to the cathode resistor of the first voltage amplification stage of the said amplifier.

ARTHUR A. BRANT.
EVERETT A. GILBERT.

REFERENCES CITED

The following references are of record in the file of this patent:

UNITED STATES PATENTS

| Number | Name | Date |
|---|---|---|
| 2,153,636 | Matsubara | Apr. 11, 1939 |
| 2,190,321 | Potapenko | Feb. 13, 1940 |
| 2,190,323 | Potapenko et al. | Feb. 13, 1940 |
| 2,190,324 | Peterson | Feb. 13, 1940 |

OTHER REFERENCES

"Geophysical Exploration," Heiland, pages 28–30 and 744–754, published 1940 by Prentice Hall, Inc., N. Y. C.